(12) United States Patent
Kiecza

(10) Patent No.: US 11,232,608 B1
(45) Date of Patent: Jan. 25, 2022

(54) POLYBEZIER-BASED DIGITAL INK STROKES

(71) Applicant: Google LLC, Mountain View, CA (US)

(72) Inventor: Daniel Kiecza, Mountain View, CA (US)

(73) Assignee: Google LLC, Mountain View, CA (US)

(*) Notice: Subject to any disclaimer, the term of this patent is extended or adjusted under 35 U.S.C. 154(b) by 0 days.

(21) Appl. No.: 17/139,421

(22) Filed: Dec. 31, 2020

(51) Int. Cl.
| | |
|---|---|
| G06T 11/00 | (2006.01) |
| G06K 9/22 | (2006.01) |
| G06F 3/0488 | (2013.01) |
| G06T 11/20 | (2006.01) |
| G06F 3/041 | (2006.01) |

(52) U.S. Cl.
CPC ........ *G06T 11/001* (2013.01); *G06F 3/04883* (2013.01); *G06K 9/222* (2013.01); *G06T 11/203* (2013.01); *G06F 3/0414* (2013.01)

(58) Field of Classification Search
None
See application file for complete search history.

(56) References Cited

U.S. PATENT DOCUMENTS

| 10,235,778 | B2 | 3/2019 | Bloomfield et al. | |
|---|---|---|---|---|
| 2014/0355884 | A1* | 12/2014 | Tran | G06K 9/18 382/188 |
| 2017/0236021 | A1* | 8/2017 | Petkov | G06T 11/203 345/179 |
| 2020/0066038 | A1 | 2/2020 | Batra et al. | |
| 2020/0167069 | A1 | 5/2020 | Angelov et al. | |

* cited by examiner

*Primary Examiner* — Jeffrey J Chow
(74) *Attorney, Agent, or Firm* — McDonnell Boehnen Hulbert & Berghoff LLP

(57) ABSTRACT

An aspect of the present disclosure relates to a method including: (i) obtaining an ordered set of points in a two-dimensional space; (ii) obtaining, for each point in the ordered set of points, a width value; (iii) determining a plurality of left points and a plurality of right points in the two-dimensional space, wherein each point in the ordered set of points corresponds to a left point in the plurality of left points and a right point in the plurality of right points such that the left and right points are separated by the width value obtained for the point in the ordered set of points; and (iv) determining a left curve and a right curve defining boundaries of a virtual brushstroke in the two-dimensional space.

20 Claims, 5 Drawing Sheets

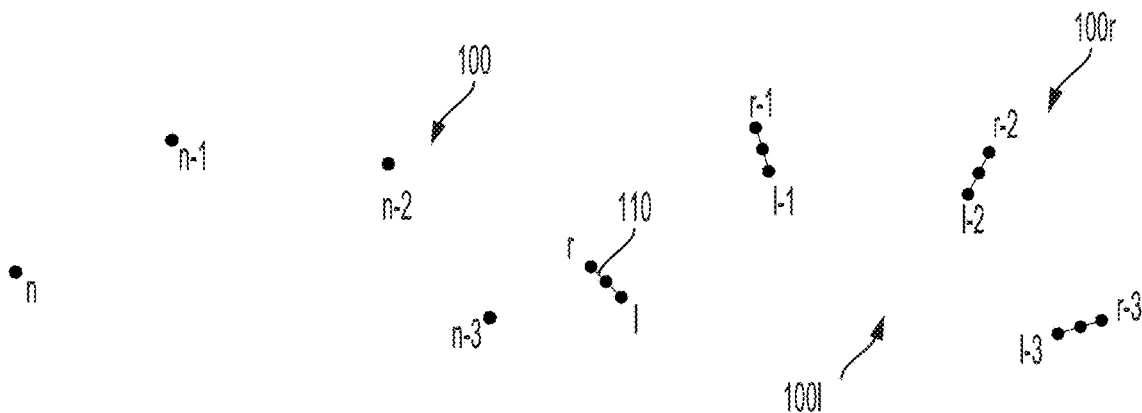
FIG. 1A    FIG. 1B
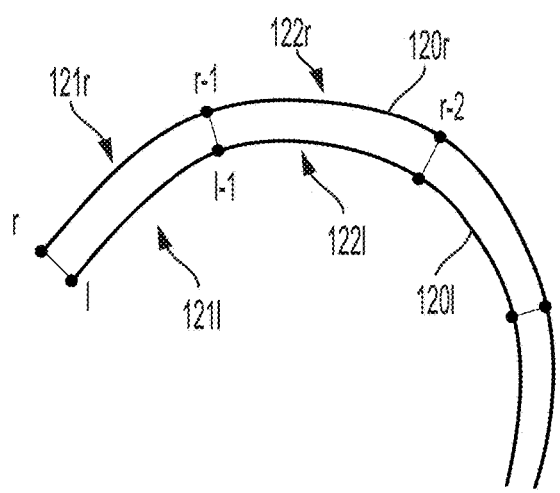   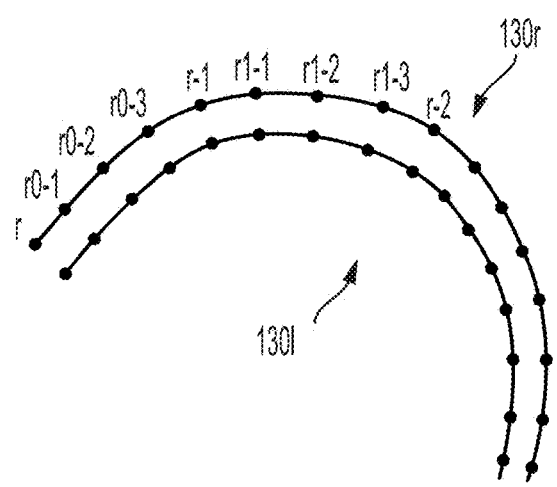
FIG. 1C    FIG. 1D
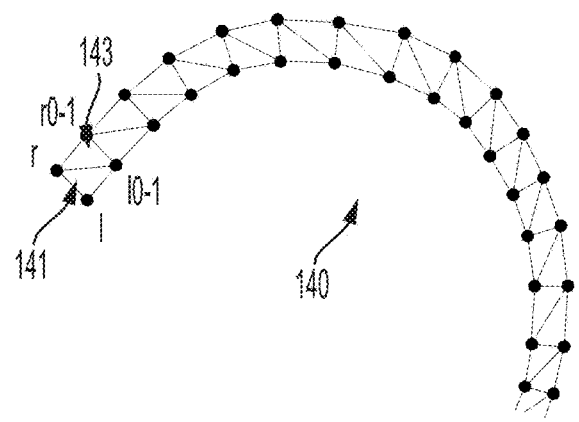
FIG. 1E

POLYBEZIER-BASED DIGITAL INK STROKES

BACKGROUND

A variety of applications include the conversion of user-drawn trajectories into simulated brushstrokes. For example, a digital painting application may convert an ordered set of points into a virtual brushstroke that simulates the appearance of ink, paint, chalk, or other artistic media. A variety of methods may be employed to generate such a virtual brushstroke to mimic, in an aesthetically pleasant manner, the characteristics of a corresponding 'real' brushstroke of a pen, pencil, paintbrush, or other implement. For example, a set of circles, 'spray' patterns, or other sprites or geometric objects could be rendered along an input trajectory.

SUMMARY

Methods are provided to generate, from input point trajectories, naturalistic and aesthetically pleasant virtual brushstrokes in a computationally inexpensive manner that is amenable to incremental additional as new trajectory points are generated. The methods include determining left and right bounding poly-lines one either side of the central trajectory. These bounding poly-lines are then used to determine bounding poly-curves that define the edges of the virtual brushstroke. The poly-curves can then be used to generate a mesh for the virtual brushstroke. The generated mesh can then be texturized for display. As additional input points are received, additional curve segments, and corresponding mesh elements, can be efficiently generated, permitting rendering of the virtual brushstroke in near real-time even on devices with very limited local computational resources An aspect of the present disclosure relates to a method including: (i) obtaining an ordered set of points in a two-dimensional space; (ii) obtaining, for each point in the ordered set of points, a width value; (iii) determining a plurality of left points in the two-dimensional space and a plurality of right points in the two-dimensional space, wherein each point in the ordered set of points corresponds to a left point in the plurality of left points and a right point in the plurality of right points such that the left point and the right point are separated by the width value obtained for the point in the ordered set of points; and (iv) determining a left curve and a right curve defining boundaries of a virtual brushstroke in the two-dimensional space, wherein the left curve includes two or more of the plurality of left points, wherein the right curve includes two or more of the plurality of right points.

The above method could additionally include determining a tangent for each point in the ordered set of points, wherein determining the plurality of left points in the two-dimensional space and the plurality of right points in the two-dimensional space comprises determining the plurality of left points and the plurality of right points such that the left point and the right point that correspond to a given point in the ordered set of points are located opposite the given point along a vector perpendicular to the tangent for the given point.

In any of the above methods, determining a left curve and a right curve in the two-dimensional space can include at least one of: (i) determining a polybezier curve that includes the two or more of the plurality of left points, or (ii) determining a polybezier curve that includes the two or more of the plurality of right points.

Any of the above methods could additionally include generating, based on the right curve and left curve, a mesh in the two-dimensional space that fills a space between the right curve and left curve. Such a method could additionally include: applying a texture to the mesh; and displaying the applied texture on a display. Such a method could yet further include providing an indication of the mesh to a graphics rendering pipeline.

In any of the above methods, obtaining the ordered set of points comprises receiving an indication of the ordered set of points from a digitizer. In such a method, obtaining a width value for each point in the ordered set of points can include receiving an indication, from the digitizer, of a pressure value corresponding to each point in the ordered set of points.

Any of the above methods could additionally include obtaining an additional point in the two-dimensional space; and, based on the additional point, updating the left curve and the right curve. Such a method could further include: generating, based on the right curve and left curve prior to updating the left curve and the right curve, a first mesh in the two-dimensional space that fills a space between the right curve and left curve; and, subsequent to updating the left curve and the right curve, generating a second mesh in the two-dimensional space that fills a space between the updated right curve and the updated left curve that the first mesh does not fill. Such a method could further include, prior to updating the left curve and the right curve, providing an indication of the first mesh to a graphics rendering pipeline; and, subsequent to updating the left curve and the right curve, providing an indication of the second mesh to the graphics rendering pipeline. Such a method could further include generating, based on the right curve and left curve prior to updating the left curve and the right curve, a first mesh in the two-dimensional space that fills a space between the right curve and left curve; and, subsequent to updating the left curve and the right curve, generating a second mesh in the two-dimensional space that fills a space between the updated right curve and the updated left curve. Such a method could further include generating, based on the right curve and left curve prior to updating the left curve and the right curve, a first mesh in the two-dimensional space that fills a space between the right curve and left curve; applying a first texture to the first mesh; and, subsequent to updating the left curve and the right curve, applying a second texture to at least a portion of the first mesh.

Another aspect of the present disclosure relates to a system including: (i) a controller comprising one or more processors; and (ii) a transitory or non-transitory computer readable medium having stored therein instructions executable by the controller to cause the controller to perform any the methods described herein.

Yet another aspect of the present disclosure relates to a transitory or non-transitory computer readable medium having stored therein instructions executable by a computing device to cause the computing device to perform any the methods described herein.

It will be appreciated that aspects can be implemented in any convenient form. For example, aspects may be implemented by appropriate computer programs which may be carried on appropriate carrier media which may be tangible carrier media (e.g. disks) or intangible carrier media (e.g. communications signals). Aspects may also be implemented using suitable apparatus which may take the form of programmable computers running computer programs arranged to implement the invention. Aspects can be combined such that features described in the context of one aspect may be implemented in another aspect.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

BRIEF DESCRIPTION OF THE FIGURES

FIG. 1A depicts example points in a two-dimensional space.

FIG. 1B depicts aspects of a method for generating a virtual brushstroke from the points of FIG. 1A.

FIG. 1C depicts aspects of a method for generating a virtual brushstroke from the points of FIG. 1A.

FIG. 1D depicts aspects of a method for generating a mesh for a virtual brushstroke generated from the points of FIG. 1A.

FIG. 1E depicts aspects of a method for generating a mesh for a virtual brushstroke generated from the points of FIG. 1A.

DETAILED DESCRIPTION

Figure 2B:
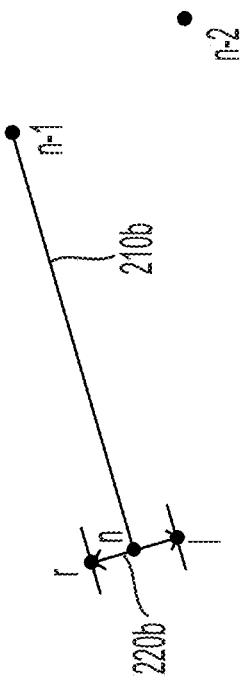
FIG. 2B depicts aspects of a method for generating a virtual brushstroke from example points in a two-dimensional space.

Examples of methods and systems are described herein. It should be understood that the words "exemplary," "example," and "illustrative," are used herein to mean "serving as an example, instance, or illustration." Any embodiment or feature described herein as "exemplary," "example," or "illustrative," is not necessarily to be construed as preferred or advantageous over other embodiments or features. Further, the exemplary embodiments described herein are not meant to be limiting. It will be readily understood that certain aspects of the disclosed systems and methods can be arranged and combined in a wide variety of different configurations.

I. EXAMPLE BRUSHSTROKE GENERATION AND UPDATING

It is beneficial in a variety of applications to convert an ordered set of points in a two-dimensional space into the shape of a virtual brushstroke that is aesthetically pleasant, that mimics 'real' brushstrokes, and that can be inexpensively generated, meshed, and texturized to facilitate rendering and display even in computationally limited applications. Methods described herein provide such functionality. The methods described herein beneficially separate generation of the geometry of the virtual brushstroke (e.g., generating poly-curves that define the boundaries of the brushstroke) from the generation of meshes for the brushstroke and the texturization of those meshes. This can allow the geometry to be generated by a separate process or computing substrate (e.g., a generic CPU) from the process (e.g., a graphics rendering pipeline) or computing substrate (e.g., a GPU) used to generate a mesh for the geometry or to texturize, render, and/or display the virtual brushstroke. The methods described herein also beneficially permit, in a computationally inexpensive manner, iteratively updating the geometry and/or downstream mesh or texture of the virtual brushstroke as additional points are obtained for an ongoing brushstroke. This allows the virtual brushstroke to be generated in nearly real-time even on low-cost tablets or other computationally limited systems.

In describing the methods herein, obtaining the underlying ordered points for a virtual brushstroke is generally described as using a digitizer or other user interface element(s) to detect points of a trajectory being input by a user (e.g., by a user applying a stylus to a surface of a digitizer). However, the points used to generate a virtual brushstroke may be obtained in some other manner. For example, the points could be stored in a data storage and obtaining the points could include accessing the stored points from the data storage. In another example, the points could be generated by an automating or semi-automatic process. For example, a text string could be converted into a series of points that represent the text string in script as a trajectory of points. In another example, the series of points could be output by a simulation, e.g., a simulation of a finger, stylus, or other object moving across a surface. Further, the methods described herein may be used to generate a complete virtual brushstroke from a set of points or may be employed to generate the virtual brushstroke iteratively, in segments (e.g., to facilitate animating the creation of the virtual brushstroke, as though it was being created over time by a virtual pen, pencil, brush, or other implement).

FIG. 1A illustrates an ordered set of points 100 in a two-dimensional space. The ordering of the points is indicated by their numbering. Accordingly, point n is the final point in the ordered set 100, point n-1 is the prior point in the ordered set 100, etc. This could mean that point n is the most recently-obtained point of the set (e.g., the point most recently generated by a digitizer as a result of a user's interaction with the digitizer using their finger, a stylus, etc.). Each point could also be associated with additional information that can then be used to generate a virtual brushstroke. For example, a pressure value could be obtained for each of the points (e.g., detected by a digitizer that is also used to generate the points) and used to set a width or other properties of the virtual brushstroke at each of the points 100. The points could additionally or alternatively be associated with angle values (e.g., the angle of a stylus used to input the points), a status of or pressure on a button on a stylus, etc. Such variables could be used to set a width, a degree of asymmetry relative to the underlying points 100, a 'dryness', or some other property of the geometry, opacity, saturation, color, texture, or other properties of the generated virtual brushstroke.

The ordered set of points 100 are used to generate a set of left points 100*l* and a set of right points 100*r* on either side of the ordered set of points 100. This is illustrated in FIG. 1B. Each point in the ordered set of points is associated with a respective left point and a respective right point. So, for example, point n is associated with left point l and right point r, point n-1 is associated with left point l-1 and right point r-1, etc. Each pair of left and right points is located opposite the associated point of the ordered set of points 100 along a respective normal vector and separated by a respective width. This is illustrated by way of example in FIG. 1B by left point l and right point r being separated by a normal vector 110 that passes through point n.

The direction of the normal vector 110 can be determined in a number of ways. In some examples, a tangent through the central point along the underlying trajectory can be determined. The normal vector 110 can then be determined perpendicular to the tangent. Such a tangent can be determined in a variety of ways, e.g., by fitting a polynomial curve (e.g., a Bezier curve) or some other function through two or more points of the ordered set of points. Such a method could rely only on 'previous' points in the ordered set of points, permitting the tangent for a newly-obtained point to be generated without waiting to obtain any subsequent point(s) in the ordered set (in examples where the points are being obtained over time, rather than generated at once via a simulation or accessed from a data storage). Alternatively, the tangent-determining method could rely on 'subsequent' points in the ordered set of points. To facilitate 'real time' generation of the virtual brushstroke, an initial tangent for a point could be determined and then later updated (along with dependent aspects of the generated virtual brushstroke, mesh, texture, etc.) based on subsequently-obtained points.

The width of this separation between corresponding left and right points can be determined in a variety of ways. In some examples, the width could be determined based on a pressure value for the underlying point, e.g., based on a pressure detected by a digitizer while a user inputs a trajectory using the digitizer. However, additional or alternative factors could be used to determine the width of the virtual brushstroke at a particular point. For example, the width could be determined in whole or in part on the speed of the underlying trajectory at the point (e.g., the speed with which a user's finger or stylus was moving when the point was generated) in order to simulate the 'pooling' of ink when using a fountain pen or marker.

Once the set of left points 100*r* and the set of left points 100*l* are generated, they can be used to determine a left curve and a right curve, respectively, that define boundaries of the virtual brushstroke in the two-dimensional space. This is illustrated by way of example in FIG. 1C with the right curve 120*r* and the left curve 120*l*. Such curves can be determined, based on the underlying sets of left points and right points, in a variety of ways. For example, one or more polynomials, Bezier curves, or other curved functions could be fit to the set of points and/or to sub set(s) of the set of points.

Each of the curves could be composed of a set of smaller curves, e.g., the right curve 120*r* could be a poly-curve composed of individual curve segments including the illustrated first 121*r* and second 122*r* curve segments that make up the right curve 120*r*. Such curve segments could contact and/or pass through respective sets of two or more points of the set of right points 120*r*. For example, the first curve segment 121*r* includes points r and r-1, the second curve segment 122*r* includes points r-1 and r-2, etc. The curve segments could then be Bezier curves (or some other type of curve) specified to end in the associated terminal right points. In such an example, the right curve 120*r* would be a poly-Bezier (or some other variety of poly-curve) composed of the individual fitted Bezier curves 121*r*, 122*r*, etc.

The left 120*l* and right 120*r* curves that define the boundaries of the virtual brushstroke can then be used to determine additional information for the brushstroke (e.g., to determine a mesh for rendering the virtual brushstroke) and/or to display the virtual brushstroke. This can include determining a mesh to fill the space between the left 120*l* and right 120*r* curves. Such a mesh can then be texturized or otherwise used, e.g., to display the virtual brushstroke on a screen. For example, the left 120*l* and right 120*r* curves could be used to interpolate the left 100*l* and right 100*r* sets of points to generated an interpolated set of left points 130*l* and an interpolated set of right points 130*r* (shown in FIG. 1D) that can then be used to generate a mesh 140 (shown in FIG. 1E) that fills the space between the left curve 120*l* and the right curve 120*r*. Alternatively, the left 100*l* and right 100*r* sets of points could be meshed without performing an interpolation or other upsampling method. This meshing process includes using the points r, r0-1, l, and l0-1 to create first 141 and second 143 triangular faces of the mesh 140.

For example, the first curve segment 121*r* could be used to generate interpolated points r0-1, r0-2, r0-3 between right points r and r-1. A variety of different methods could be used to generate the interpolated points. For example, De Casteljau's algorithm could be used to efficiently interpolate points when the underlying curve segment is a Bezier curve or other appropriate polynomial form.

The mesh 130 could then be texturized and used to display the virtual brushstroke (e.g., on a touchscreen that is also being used to generate the underlying ordered set of points used to generate the virtual brushstroke). This could include sending an indication of the set of mesh points to an OpenGL instance or to some other graphics rendering pipeline. The graphics rendering pipeline can then apply a texture to and/or perform other rendering tasks on the mesh.

The left/right curves and/or mesh for a virtual brushstroke could be determined all together for a given ordered set of points. Alternatively, the left/right curves and/or mesh could be determined iteratively, updating previously-generated curves/meshes based on additional trajectory points (e.g., additional point obtained from a digitizer as a user inputs the trajectory). For example, the left 120*l* and right 120*r* curves could be determined based only on points n-1, n-2, n-3, etc. (i.e., based on right points r-1, r-2, r-3 . . . and left points l-1, l-2, l-3 . . . 4 The final point n could then be used to update the left 120*l* and right 120*r* curves to include right curve segment 121*r* and left curve segment 121*l*. Similarly, the mesh 140 could be updated to include additional faces including faces 141 and 143. In some examples, such an update could include only adding additional points/curve segments/mesh elements. Alternatively, an update could include replacing some or all of the already-generated left/right curves or mesh. For example, a putative mesh could be generated based on an estimated tangent for point n-1, prior to obtaining point n. Subsequent to obtaining point n, the tangent for point n-1 could be updated based on point n, as could the left/right points (e.g., r-1, l-1), left/right curve segments (e.g., 122*r*, 122*l*), and/or mesh elements that are dependent thereon.

The tangent for a particular point in the ordered set of points could be determined in a variety of ways. FIG. 2A shows an example method wherein the tangent for a point n-1 is determined parallel to a tangent line 210*a* through its neighboring points n and n-2. Corresponding left l-1 and right r-1 points can then be determined on opposite sides of the point n-1 along a normal vector 220*a* that is orthogonal to the tangent 210*a*. Note that the points r-1, l-1 being located along a vector orthogonal to the tangent is intended as a non-limiting example embodiment; the relationship could be determined in some other manner. For example, the angle could be determined based on an angle value for the point n-1 that corresponds to an angle at which a stylus was held by a user when the user input the point n-1 using the stylus.

Figure 2A:
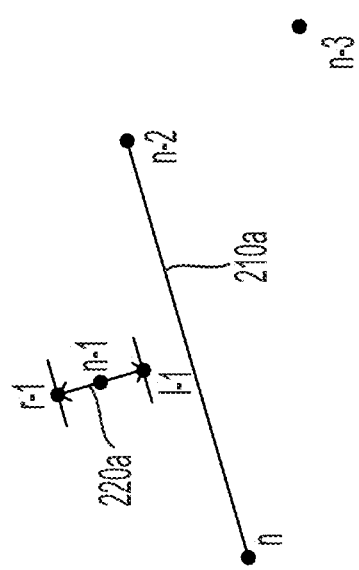
FIG. 2A depicts aspects of a method for generating a virtual brushstroke from example points in a two-dimensional space.

FIG. 2B shows another example method that does not rely on 'subsequent' points in the ordered set of points. In FIG. 2B, the tangent for a point n is determined parallel to a tangent line 210*b* through itself and neighboring point n-1. Corresponding left l and right r points can then be determined on opposite sides of the point n along a normal vector 220*b* that is orthogonal to the tangent 210*b*. Note that this method, since it does not rely on access to 'subsequent' points, can be performed closer to 'real time' as points are generated, e.g., by a user interacting with a digitizer. In some examples, the tangent for a point could be determined first using the method of FIG. 2B, and then, once the 'subsequent' point is available, the tangent for the point could be updated using the method of FIG. 2A. Additionally or alternatively, the method of 2B could be used when the points are sufficiently far apart (e.g., due to a user moving a stylus across a digitizer at a higher speed) such that the tangent provided by the method of FIG. 2B is likely to approximate the tangent provided by the method of FIG. 2A.

The example implementation shown in FIGS. 1A-E was based on an underlying ordered set of points whose effective 'curvature' was sufficiently low that adjacent pairs of left and right points (e.g., for pair l and r and second pair r0-1 and l0-1) had non-overlapping normal vectors and so defined simple quadrilateral shapes that could be easily meshed, with two triangular faces for each quadrilateral shape. However, in some cases the 'curvature' of the ordered set of points may be such that the normal vectors for pairs of left and right points of a virtual brushstroke overlap. In such cases, the area between the pairs' normal vectors will have a 'bowtie' shape, and will partially overlap with the area between the preceding pairs' normal vectors, potentially complicating the process of generating a mesh for the virtual brushstroke.

Figure 3A:
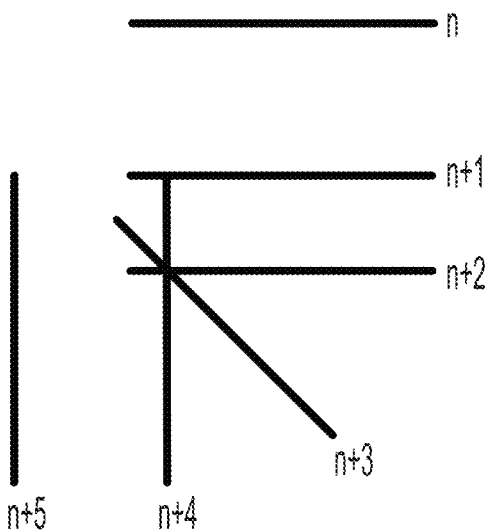
FIG. 3A depicts example pairs of points that define boundaries for a virtual brushstroke in a two-dimensional space.

These scenarios are illustrated by way of example in FIG. 3A. Each of the solid line segments represents a vector between corresponding left and right points of a virtual brushstroke. So, line n extends between a first left point and a first right point, line n+1 extends between a second left point and a second right point, etc. The pairs of left and right points may be points that correspond to respective points of an underlying ordered set of points for the virtual brushstroke and/or may be left and right points interpolated between such points (e.g., by fitting Bezier or other curves and then interpolating along those fitted curves).

Figure 3B:
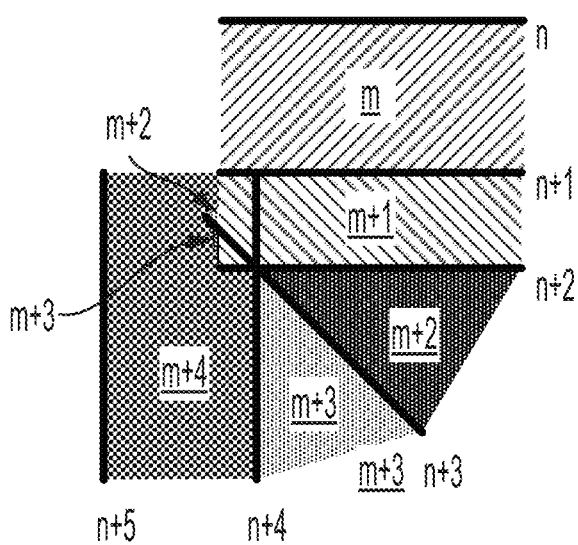
FIG. 3B depicts aspects of a method for generating a mesh for a virtual brushstroke from the pairs of points of FIG. 3A.

Lines n and n+1 do not overlap, and so the area between them is a quadrilateral m as shown in FIG. 3B. Lines n+1 and n+2 also do not overlap, and so the area between them is another quadrilateral m+1 that does not overlap with m. However, lines n+2 and n+3 overlap, and so the area between them is a bowtie-shaped area m+2 that does overlap with m+1. Lines n+3 and n+4 overlap with each other so the area between them is a bowtie-shaped area m+3 that overlaps with both m+2 and m+1 (due to n+4 also overlapping with n+2). Lines n+4 and n+5 do not overlap, and so the area between them is a quadrilateral m+4. However, this area does overlap with areas m+2 and m+3.

Figure 3C:
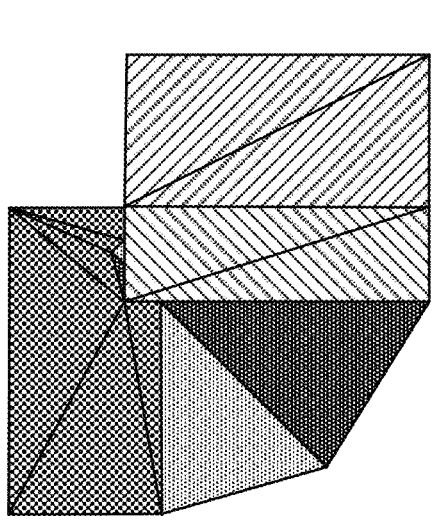
FIG. 3C depicts aspects of a method for generating a mesh for a virtual brushstroke from the pairs of points of FIG. 3A.

Disregarding the overlapping of the areas depicted in FIG. 3B, a mesh could be determined for a virtual brushstroke by determining two triangular faces that share an edge for each of the quadrilateral areas and two triangular faces that only share a central vertex for each of the bowtie-shaped areas. However, such a mesh would have areas represented by more than one face. A method for meshing such a sequence of pairs of points is depicted in FIG. 3C. As shown in FIG. 3C, the mesh 300 could be determined incrementally, by sequentially adding segments of area and meshing those portions of the added area that do not overlap with any previously added areas. Thus, area m is meshed by two triangular faces that share an edge. Area m+1 is also meshed by two triangular faces that share an edge. Area m+2 is meshed by two triangular faces, one larger (to the lower right in FIG. 3C) and one smaller. Area m+3 is also meshed by two triangular faces, one larger (to the lower right in FIG. 3C) and one smaller. Finally, area m+4 is meshed by six triangles.

Note that the lookback for determining whether a newly-added area overlaps with previously-added areas could be limited, e.g., to a specified number of immediately previously added areas. This could be done to reduce the memory and compute cost of evaluating whether an overlap is present and of determining the shape of the non-overlapping portion of the newly-added area. Such a limitation could also allow the virtual brushstroke to 'cross over' itself, as a 'real' brushstroke (e.g., of paint, chalk, wax) would.

A variety of methods could be employed to apply a texture (e.g., a gradient texture 350) to a mesh generated as described herein (e.g., mesh 300). For example, portions of a long two-dimensional texture image could be applied to respective portions (e.g., faces) of the mesh. Extracted quadrilateral portions of the two-dimensional texture image could be transformed (e.g., by applying an affine transformation) in order to apply them to respective areas of a virtual brushstroke mesh.

Figure 3D:
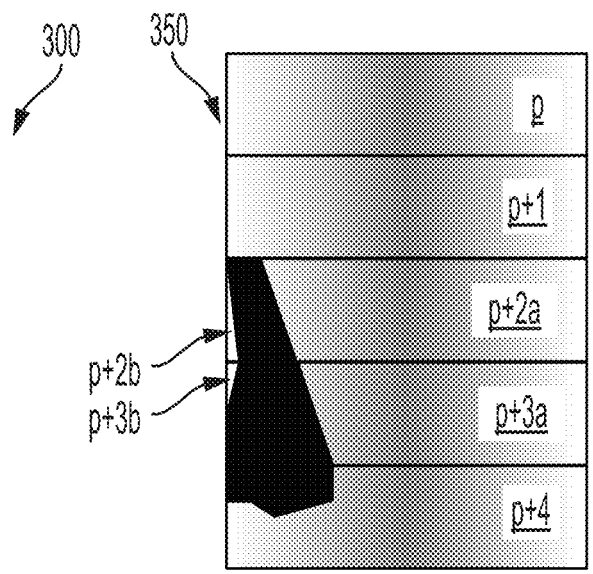
FIG. 3D depicts aspects of a method for applying a texture to a mesh determined for a virtual brushstroke defined by the pairs of points of FIG. 3A.

FIG. 3D illustrates an example gradient texture 350. An apportionment of the gradient texture 350 to respective areas of the mesh 300 is also depicted in FIG. 3D. In the example, the top-most area of the texture 350, p, can be transformed and applied to area m of the mesh 300. The middle area of the texture 350 is divided between an area p+2a that can be transformed and applied to the larger, bottom-right portion of area m+2 of the mesh 300 and an area p+2b that can be transformed and applied to the smaller, upper-left portion of area m+2 of the mesh 300. The black area on the texture 350 indicates portions of the texture 350 that will not be rendered because they correspond to areas of their respective segments of the mesh 300 that are overlapped by prior segments of the mesh 300.

As shown, the texture 350 is divided into equal-length areas to be divided amongst the various segments of the mesh 300. However, the areas could have varying lengths. For example, the length of an area of the texture 350 to be applied to a particular segment of the mesh 300 could be determined based on the area of the mesh 300 segment, an effective length of the mesh segment, or some other property of the mesh 300 segment.

Figure 3E:
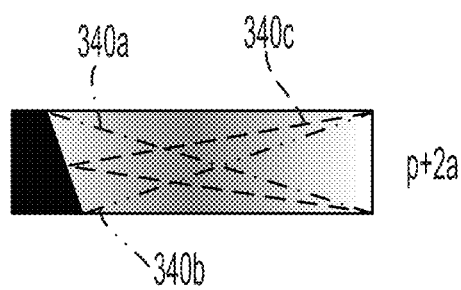
FIG. 3E depicts aspects of a method for applying a texture to a mesh determined for a virtual brushstroke defined by the pairs of points of FIG. 3A.

To apply a quadrilateral area of the texture 350 to a corresponding triangular area of the mesh 300 (e.g., to apply area p+2a to the lower-right portion of area m+2), a non-linear transform could be applied to the quadrilateral area of the texture 350. However, such a transform may be computationally expensive. As a computationally lower-cost approximation, a triangular portion of the quadrilateral area of the texture 350 could instead be applied to the triangular area of the mesh 300. This is illustrated by way of example in FIG. 3E, which depicts area p+2a of the texture 350. A 'middle' triangular portion of area p+2a (within the dashed lines 340c) could be applied. To further reduce the computational cost, one of an 'upper' triangular portion of area p+2a (above dashed line 340a) or a 'lower' triangular portion of area p+2a (below dashed line 340b) could be applied.

II. EXAMPLE SYSTEMS

Figure 4:
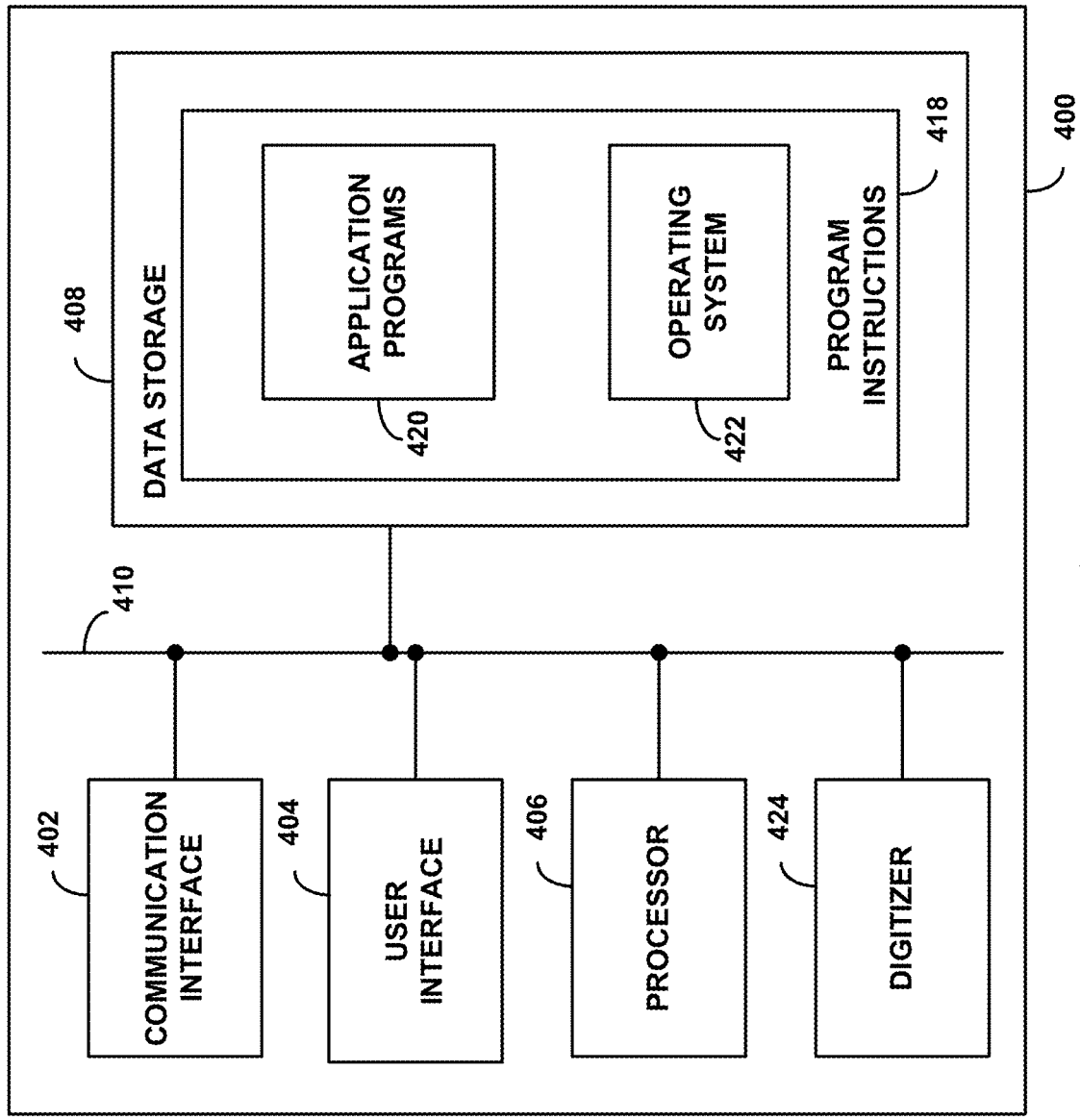
FIG. 4 is a simplified block diagram showing some of the components of an example computing system.

Computational functions (e.g., functions to generate bounding curves for a virtual brushstroke, to generate a mesh therefrom, to apply a texture to such a mesh, and/or to update any of the foregoing based on additional points of an underlying trajectory) described herein may be performed by one or more computing systems. Such a computing system may be integrated into or take the form of a computing device, such as a mobile phone, tablet computer, laptop computer, server, cloud computing network, camera, wearable display, and/or programmable logic controller. For purposes of example, FIG. 4 is a simplified block diagram showing some of the components of an example computing device 400 that may include a digitizer 424 or other means for inputting a trajectory and associated pressure or other parameters related to a virtual brushstroke. The digitizer 424 may include one or more capacitive sensor arrays, resistive sensor arrays, antenna arrays for detecting the location and/or orientation of a coil, ferrite, or other components of a stylus, wireless communications components for communicating with a style to receive a pressure detected by the stylus, piezo elements or other pressure-sensitive components for detecting a pressure with which a finger or drawing implement is contacting the digitizer surface, or other components configured to provide information sufficient to obtain location, orientation, pressure, or other information about a trajectory input by a user.

By way of example and without limitation, computing device 400 may be a cellular mobile telephone (e.g., a smartphone), a tablet computer, a computer (such as a desktop, notebook, tablet, or handheld computer that may include a digitizer and/or a touch-sensitive screen for inputting drawn trajectories or other user inputs), a personal digital assistant (PDA), a wearable computing device, a wearable display, an augmented reality or virtual reality headset, or some other type of device that may be equipped with information processing capabilities. It should be understood that computing device 400 may represent a physical device such a laptop with an integrated digitizer/touch screen, a particular physical hardware platform on which virtual brushstroke generation and/or simulation application operates in software, or other combinations of hardware and software that are configured to carry out brushstroke generation, meshing, texturing, and/or other functions.

As shown in FIG. 4, computing device 400 may include a communication interface 402, a user interface 404, a processor 406, data storage 408, and a digitizer 424, all of which may be communicatively linked together by a system bus, network, or other connection mechanism 410. In some examples, the digitizer 424 can be considered part of the user interface 404.

Communication interface 402 may function to allow computing device 400 to communicate, using analog or digital modulation of electric, magnetic, electromagnetic, optical, or other signals, with other devices, access networks, and/or transport networks. Thus, communication interface 402 may facilitate circuit-switched and/or packet-switched communication, such as plain old telephone service (POTS) communication and/or Internet protocol (IP) or other packetized communication. For instance, communication interface 402 may include a chipset and antenna arranged for wireless communication with a radio access network or an access point. Also, communication interface 402 may take the form of or include a wireline interface, such as an Ethernet, Universal Serial Bus (USB), or High-Definition Multimedia Interface (HDMI) port. Communication interface 402 may also take the form of or include a wireless interface, such as a Wifi, BLUETOOTH®, global positioning system (GPS), or wide-area wireless interface (e.g., WiMAX or 3GPP Long-Term Evolution (LTE)). However, other forms of physical layer interfaces and other types of standard or proprietary communication protocols may be used over communication interface 402. Furthermore, communication interface 402 may comprise multiple physical communication interfaces (e.g., a Wifi interface, a BLUETOOTH® interface, and a wide-area wireless interface).

In some embodiments, communication interface 42 may function to allow computing device 400 to communicate, with other devices, remote servers, access networks, and/or transport networks. For example, the communication interface 402 may function to transmit an indication of a geometry of a virtual brushstroke (e.g., two poly-curves defining the boundaries of the virtual brushstroke), a mesh determined for a virtual brushstroke, a texture applied to a virtual brushstroke, or some other information related to a virtual brushstroke.

User interface 404 may function to allow computing device 400 to interact with a user, for example to receive input from and/or to provide output to the user. Thus, user interface 404 may include input components such as a keypad, keyboard, touch-sensitive or presence-sensitive panel, computer mouse, trackball, joystick, microphone, instrumented glove, force-feedback devices, and so on. User interface 404 may also include one or more output components such as haptic outputs, force-feedback outputs, or a display screen which, for example, may be an augmented reality screen that permits a user to also view the environment of the user through the display screen. The display screen may be based on CRT, LCD, and/or LED technologies, or other technologies now known or later developed. User interface 404 may also be configured to generate audible output(s), via a speaker, speaker jack, audio output port, audio output device, earphones, and/or other similar devices.

Processor 406 may comprise one or more general purpose processors—e.g., microprocessors—and/or one or more special purpose processors—e.g., digital signal processors (DSPs), graphics processing units (GPUs), floating point units (FPUs), network processors, or application-specific integrated circuits (ASICs). In some instances, special purpose processors may be capable of image processing, decision tree computation, rotation and/or translation of location information in three-dimensional space, template matching, and point projection, among other applications or functions. Data storage 408 may include one or more volatile and/or non-volatile storage components, such as magnetic, optical, flash, or organic storage, and may be integrated in whole or in part with processor 406. Data storage 408 may include removable and/or non-removable components.

Processor 406 may be capable of executing program instructions 418 (e.g., compiled or non-compiled program logic and/or machine code) stored in data storage 408 to carry out the various functions described herein. Therefore, data storage 408 may include a non-transitory computer-readable medium, having stored thereon program instructions that, upon execution by computing device 400, cause computing device 400 to carry out any of the methods, processes, or functions disclosed in this specification and/or the accompanying drawings.

By way of example, program instructions 418 may include an operating system 422 (e.g., an operating system kernel, device driver(s), and/or other modules) and one or more application programs 420 (e.g., virtual brushstroke generation, meshing, texturization, and/or display programs) installed on computing device 400.

Application programs 420 may take the form of "apps" that could be downloadable to computing device 400 through one or more online application stores or application markets (via, e.g., the communication interface 402). However, application programs can also be installed on computing device 400 in other ways, such as via a web browser or through a physical interface (e.g., a USB port) of the computing device 400.

III. EXAMPLE METHODS

Figure 5:
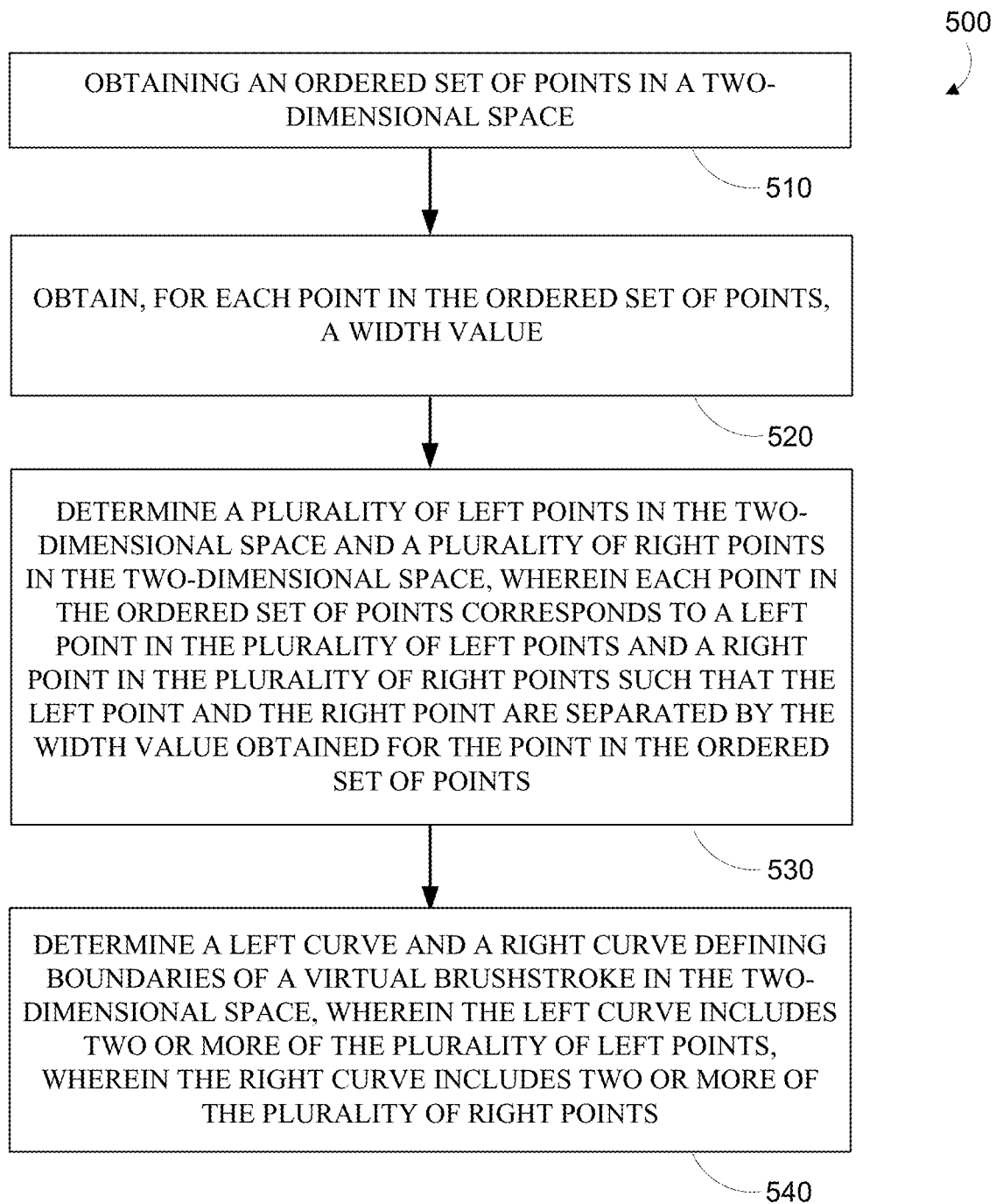
FIG. 5 is a flowchart of a method.

FIG. 5 is a flowchart of a method 500 for defining boundaries of a virtual brushstroke. The method 500 includes obtaining an ordered set of points in a two-dimensional space (510). The method 500 additionally includes obtaining, for each point in the ordered set of points, a width value (520). The method 500 additionally includes determining a plurality of left points in the two-dimensional space and a plurality of right points in the two-dimensional space, wherein each point in the ordered set of points corresponds to a left point in the plurality of left points and a right point in the plurality of right points such that the left point and the right point are separated by the width value obtained for the point in the ordered set of points (530). The method 500 additionally includes determining a left curve and a right curve defining boundaries of the virtual brushstroke in the two-dimensional space, wherein the left curve includes two or more of the plurality of left points, wherein the right curve includes two or more of the plurality of right points (540). The method 500 could include additional elements or features.

IV. CONCLUSION

The above detailed description describes various features and functions of the disclosed systems, devices, and methods with reference to the accompanying figures. In the figures, similar symbols typically identify similar components, unless context indicates otherwise. The illustrative embodiments described in the detailed description, figures, and claims are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flowcharts in the figures and as discussed herein, each step, block and/or communication may represent a processing of information and/or a transmission of information in accordance with example embodiments. Alternative embodiments are included within the scope of these example embodiments. In these alternative embodiments, for example, functions described as steps, blocks, transmissions, communications, requests, responses, and/or messages may be executed out of order from that shown or discussed, including in substantially concurrent or in reverse order, depending on the functionality involved. Further, more or fewer steps, blocks and/or functions may be used with any of the message flow diagrams, scenarios, and flow charts discussed herein, and these message flow diagrams, scenarios, and flow charts may be combined with one another, in part or in whole.

A step or block that represents a processing of information may correspond to circuitry that can be configured to perform the specific logical functions of a herein-described method or technique. Alternatively or additionally, a step or block that represents a processing of information may correspond to a module, a segment, or a portion of program code (including related data). The program code may include one or more instructions executable by a processor for implementing specific logical functions or actions in the method or technique. The program code and/or related data may be stored on any type of computer-readable medium, such as a storage device, including a disk drive, a hard drive, or other storage media.

The computer-readable medium may also include non-transitory computer-readable media such as computer-readable media that stores data for short periods of time like register memory, processor cache, and/or random access memory (RAM). The computer-readable media may also include non-transitory computer-readable media that stores program code and/or data for longer periods of time, such as secondary or persistent long term storage, like read only memory (ROM), optical or magnetic disks, and/or compact-disc read only memory (CD-ROM), for example. The computer-readable media may also be any other volatile or non-volatile storage systems. A computer-readable medium may be considered a computer-readable storage medium, for example, or a tangible storage device.

Moreover, a step or block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

I claim:

1. A method comprising:
   obtaining an ordered set of points in a two-dimensional space;
   obtaining, for each point in the ordered set of points, a width value;
   determining a tangent for each point in the ordered set of points;
   based on the tangents and width values for the ordered set of points, determining a plurality of left points in the two-dimensional space and a plurality of right points in the two-dimensional space, wherein each point in the ordered set of points corresponds to a left point in the plurality of left points and a right point in the plurality of right points such that the left point and the right point are separated by the width value obtained for the point in the ordered set of points and further such that the left point and the right point are located opposite the point in the ordered set of points along a vector that is perpendicular to the tangent determined for the point in the ordered set of points and that passes through the point in the ordered set of points; and determining a left curve and a right curve defining boundaries of a virtual brushstroke in the two-dimensional space, wherein the left curve includes two or more of the plurality of left points, wherein the right curve includes two or more of the plurality of right points.

2. The method of claim 1, wherein determining a left curve and a right curve in the two-dimensional space comprises at least one of: (i) determining a polybezier curve that includes the two or more of the plurality of left points, or (ii). determining a polybezier curve that includes the two or more of the plurality of right points.

3. The method of claim 1, further comprising:
generating, based on the right curve and left curve, a mesh in the two-dimensional space that fills a space between the right curve and left curve.

4. The method of claim 3, further comprising:
applying a texture to the mesh; and
displaying the applied texture on a display.

5. The method of claim 3, further comprising:
providing an indication of the mesh to a graphics rendering pipeline.

6. The method of claim 1, wherein obtaining the ordered set of points comprises receiving an indication of the ordered set of points from a digitizer.

7. The method of claim 6, wherein obtaining a width value for each point in the ordered set of points comprises receiving an indication, from the digitizer, of a pressure value corresponding to each point in the ordered set of points.

8. The method of claim 1, further comprising:
obtaining an additional point in the two-dimensional space; and
based on the additional point, updating the left curve and the right curve.

9. The method of claim 8, further comprising:
generating, based on the right curve and left curve prior to updating the left curve and the right curve, a first mesh in the two-dimensional space that fills a space between the right curve and left curve; and
subsequent to updating the left curve and the right curve, generating a second mesh in the two-dimensional space that fills a space between the updated right curve and the updated left curve that the first mesh does not fill.

10. The method of claim 9, further comprising:
prior to updating the left curve and the right curve, providing an indication of the first mesh to a graphics rendering pipeline; and
subsequent to updating the left curve and the right curve, providing an indication of the second mesh to the graphics rendering pipeline.

11. The method of claim 8, further comprising:
generating, based on the right curve and left curve prior to updating the left curve and the right curve, a first mesh in the two-dimensional space that fills a space between the right curve and left curve; and
subsequent to updating the left curve and the right curve, generating a second mesh in the two-dimensional space that fills a space between the updated right curve and the updated left curve.

12. The method of claim 8, further comprising:
generating, based on the right curve and left curve prior to updating the left curve and the right curve, a first mesh in the two-dimensional space that fills a space between the right curve and left curve;

applying a first texture to the first mesh; and
subsequent to updating the left curve and the right curve, applying a second texture to at least a portion of the first mesh.

13. A system comprising:
a controller comprising one or more processors; and
a non-transitory computer readable medium having stored therein instructions executable by the controller to cause the controller to perform controller operations comprising:
obtaining an ordered set of points in a two-dimensional space;
obtaining, for each point in the ordered set of points, a width value;
determining a tangent for each point in the ordered set of points;
based on the tangents and width values for the ordered set of points, determining a plurality of left points in the two-dimensional space and a plurality of right points in the two-dimensional space, wherein each point in the ordered set of points corresponds to a left point in the plurality of left points and a right point in the plurality of right points such that the left point and the right point are separated by the width value obtained for the point in the ordered set of points and further such that the left point and the right point are located opposite the point in the ordered set of points along a vector that is perpendicular to the tangent determined for the point in the ordered set of points and that passes through the point in the ordered set of points; and
determining a left curve and a right curve defining boundaries of a virtual brushstroke in the two-dimensional space, wherein the left curve includes two or more of the plurality of left points, wherein the right curve includes two or more of the plurality of right points.

14. The system of claim 13, wherein the controller operations further comprise:
obtaining an additional point in the two-dimensional space; and
based on the additional point, updating the left curve and the right curve.

15. The system of claim 14, wherein the controller operations further comprise:
generating, based on the right curve and left curve prior to updating the left curve and the right curve, a first mesh in the two-dimensional space that fills a space between the right curve and left curve; and
subsequent to updating the left curve and the right curve, generating a second mesh in the two-dimensional space that fills a space between the updated right curve and the updated left curve.

16. The system of claim 14, wherein the controller operations further comprise:
generating, based on the right curve and left curve prior to updating the left curve and the right curve, a first mesh in the two-dimensional space that fills a space between the right curve and left curve; and
subsequent to updating the left curve and the right curve, generating a second mesh in the two-dimensional space that fills a space between the updated right curve and the updated left curve that the first mesh does not fill.

17. A non-transitory computer readable medium having stored therein instructions executable by a computing device to cause the computing device to perform controller operations comprising:

obtaining an ordered set of points in a two-dimensional space;

obtaining, for each point in the ordered set of points, a width value;

determining a tangent for each point in the ordered set of points;

based on the tangents and width values for the ordered set of points, determining a plurality of left points in the two-dimensional space and a plurality of right points in the two-dimensional space, wherein each point in the ordered set of points corresponds to a left point in the plurality of left points and a right point in the plurality of right points such that the left point and the right point are separated by the width value obtained for the point in the ordered set of points and further such that the left point and the right point are located opposite the point in the ordered set of points along a vector that is perpendicular to the tangent determined for the point in the ordered set of points and that passes through the point in the ordered set of points; and determining a left curve and a right curve defining boundaries of a virtual brushstroke in the two-dimensional space, wherein the left curve includes two or more of the plurality of left points, wherein the right curve includes two or more of the plurality of right points.

18. The non-transitory computer readable medium of claim 17, wherein the controller operations further comprise:

obtaining an additional point in the two-dimensional space; and based on the additional point, updating the left curve and the right curve.

19. The non-transitory computer readable medium of claim 18, wherein the controller operations further comprise:

generating, based on the right curve and left curve prior to updating the left curve and the right curve, a first mesh in the two-dimensional space that fills a space between the right curve and left curve; and subsequent to updating the left curve and the right curve, generating a second mesh in the two-dimensional space that fills a space between the updated right curve and the updated left curve that the first mesh does not fill.

20. The non-transitory computer readable medium of claim 18, wherein the controller operations further comprise:

generating, based on the right curve and left curve prior to updating the left curve and the right curve, a first mesh in the two-dimensional space that fills a space between the right curve and left curve; and subsequent to updating the left curve and the right curve, generating a second mesh in the two-dimensional space that fills a space between the updated right curve and the updated left curve.

* * * * *